United States Patent
Unge et al.

(10) Patent No.: US 11,828,488 B2
(45) Date of Patent: Nov. 28, 2023

(54) PARTITION DEVICE, AN AIR TREATMENT APPARATUS AND A METHOD PERFORMED BY A CONTROL DEVICE, FOR CONTROLLING AN AIR TREATMENT APPARATUS

(71) Applicant: MUNTERS EUROPE AKTIEBOLAG, Kista (SE)

(72) Inventors: Daniel Unge, Skarpnack (SE); Anders Nelson, Stockholm (SE)

(73) Assignee: MUNTERS EUROPE AKTIEBOLAG, Kista (SE)

(*) Notice: Subject to any disclaimer, the term of this patent is extended or adjusted under 35 U.S.C. 154(b) by 559 days.

(21) Appl. No.: 17/057,534

(22) PCT Filed: May 8, 2019

(86) PCT No.: PCT/SE2019/050406
§ 371 (c)(1),
(2) Date: Nov. 20, 2020

(87) PCT Pub. No.: WO2019/226091
PCT Pub. Date: Nov. 28, 2019

(65) Prior Publication Data
US 2021/0190338 A1 Jun. 24, 2021

(30) Foreign Application Priority Data
May 23, 2018 (SE) .................................. 1850612-1

(51) Int. Cl.
*F24F 3/14* (2006.01)
*B01D 53/06* (2006.01)
(Continued)

(52) U.S. Cl.
CPC ............ *F24F 3/1423* (2013.01); *B01D 53/06* (2013.01); *F24F 11/74* (2018.01); *F28D 19/042* (2013.01);
(Continued)

(58) Field of Classification Search
CPC .......... F24F 3/14; F24F 3/1411; F24F 3/1423; F24F 11/72; F24F 11/74;
(Continued)

(56) References Cited

U.S. PATENT DOCUMENTS

| | | |
|---|---|---|
| 2,993,563 A | 7/1961 | Munters et al. |
| 4,365,979 A | 12/1982 | Takeyama et al. |

(Continued)

FOREIGN PATENT DOCUMENTS

| | | |
|---|---|---|
| BR | PI1007585 A2 | 11/2010 |
| CN | 101801503 A | 8/2010 |

(Continued)

OTHER PUBLICATIONS

International search Report dated Jul. 12, 2018, in International Application No. PCT/SE2019/050406.
(Continued)

*Primary Examiner* — Frank M Lawrence, Jr.
(74) *Attorney, Agent, or Firm* — Venable LLP

(57) ABSTRACT

A partition device for a reactivation section of an air treatment rotor in an air treatment apparatus includes at least one first partition member provided with a first cover area, an inlet opening and an outlet opening for a reactivation air stream and an actuating member for moving and positioning the at least one first partition member or a part of the at least one first partition member in relation to a center axis of the air treatment rotor to regulate the area and shape of the reactivation section.

17 Claims, 8 Drawing Sheets

(51) Int. Cl.
  F24F 11/74 (2018.01)
  F28D 19/04 (2006.01)
  *F24F 110/20* (2018.01)
  *F24F 110/30* (2018.01)

(52) U.S. Cl.
  CPC ... *F24F 2003/1464* (2013.01); *F24F 2110/20* (2018.01); *F24F 2110/30* (2018.01); *F24F 2203/1032* (2013.01); *F24F 2203/1068* (2013.01)

(58) Field of Classification Search
  CPC ........... F24F 2003/1464; F24F 2110/20; F24F 2110/30; F24F 2203/1032; F24F 2203/1068; F28D 19/042; B01D 53/06
  USPC ...... 96/111, 125, 126, 143, 146; 95/10, 113, 95/117; 34/80, 472, 473
  See application file for complete search history.

(56) References Cited

U.S. PATENT DOCUMENTS

| | | | |
|---|---|---|---|
| 4,452,612 A * | 6/1984 | Mattia | B01D 53/047 95/100 |
| 6,361,585 B1 | 3/2002 | Anzai et al. | |
| 7,601,206 B2 * | 10/2009 | Call | F24F 3/1423 96/127 |
| 2005/0172805 A1 * | 8/2005 | Motono | B01D 53/261 96/125 |
| 2005/0204914 A1 | 9/2005 | Boutall | |
| 2009/0282984 A1 * | 11/2009 | Lee | B01D 53/06 96/140 |
| 2017/0227241 A1 * | 8/2017 | Claesson | B01D 53/06 |

FOREIGN PATENT DOCUMENTS

| | | |
|---|---|---|
| CN | 204438369 U | 7/2015 |
| CN | 205815424 U | 12/2016 |
| CN | 206656430 U | 11/2017 |
| EP | 1 975 523 A1 | 10/2008 |
| EP | 2 010 827 A2 | 1/2009 |
| JP | 56-37021 A | 4/1981 |
| JP | 61-167427 A | 7/1986 |
| JP | 11-182969 A | 7/1999 |
| JP | 2001-272054 A | 10/2001 |
| JP | 2002-011087 A | 1/2002 |
| JP | 2004-085115 A | 3/2004 |
| JP | 3668428 B2 | 7/2005 |
| JP | 2006-308236 A | 11/2006 |
| JP | 2008-246354 A | 10/2008 |
| JP | 2010-054135 A | 3/2010 |
| WO | 2007/126248 A2 | 11/2007 |
| WO | 2010/128522 A1 | 11/2010 |
| WO | 2013/012043 A1 | 1/2013 |
| WO | 2013/038428 A1 | 3/2013 |

OTHER PUBLICATIONS

International Preliminary Report on Patentability dated Aug. 17, 2020, in International Application No. PCT/SE2019/050406.
Office Action dated Dec. 24, 2021, in Chinese Patent Application No. 201980033724.7.
Extended European Search Report dated Mar. 2, 2022, in European Patent Application No. 19806713.4.
Office Action dated Nov. 11, 2022, in Japanese Patent Application No. 2020-560798.
European Search Report dated Sep. 7, 2022, in European Patent Application No. 19806713.4.

* cited by examiner

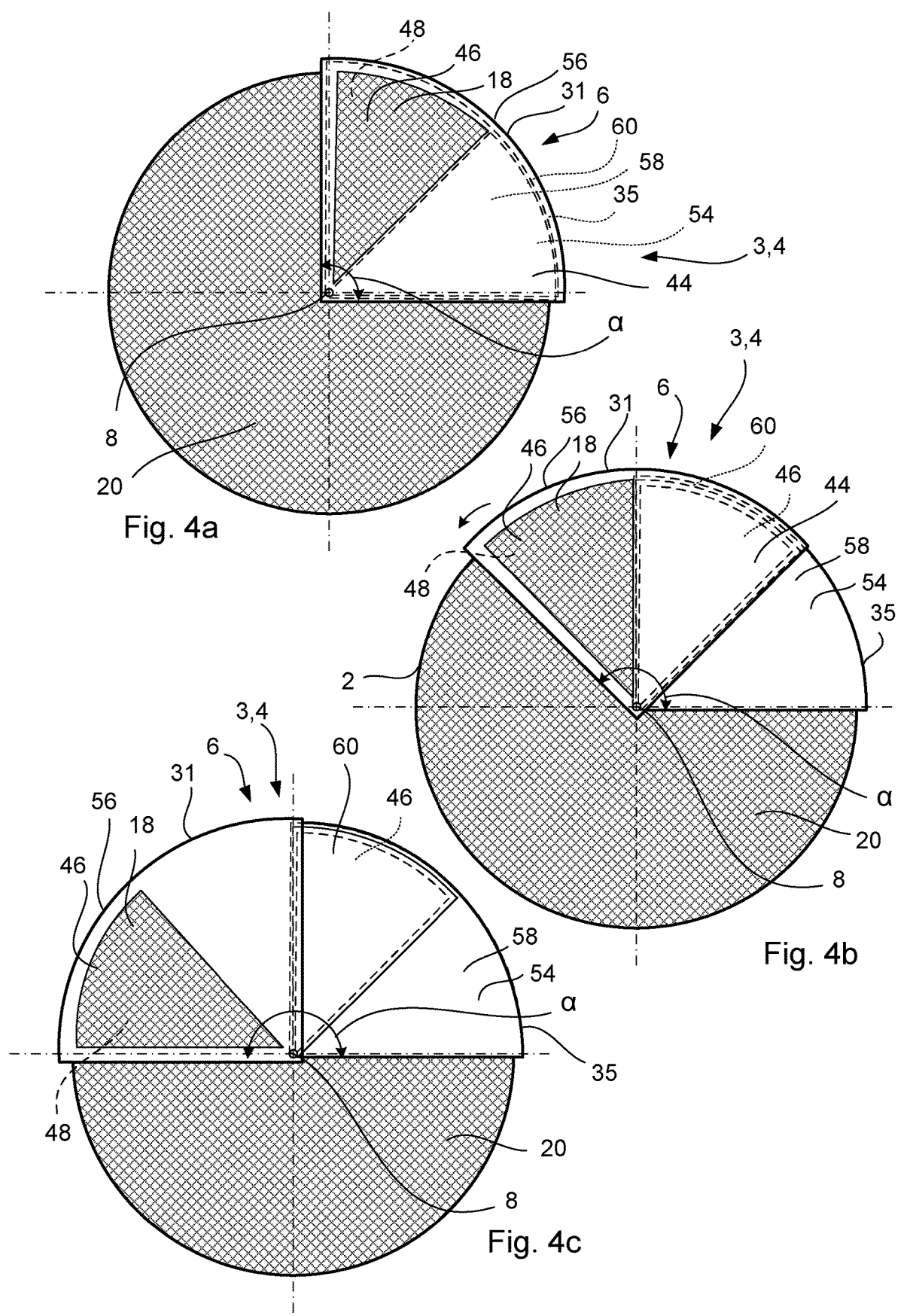

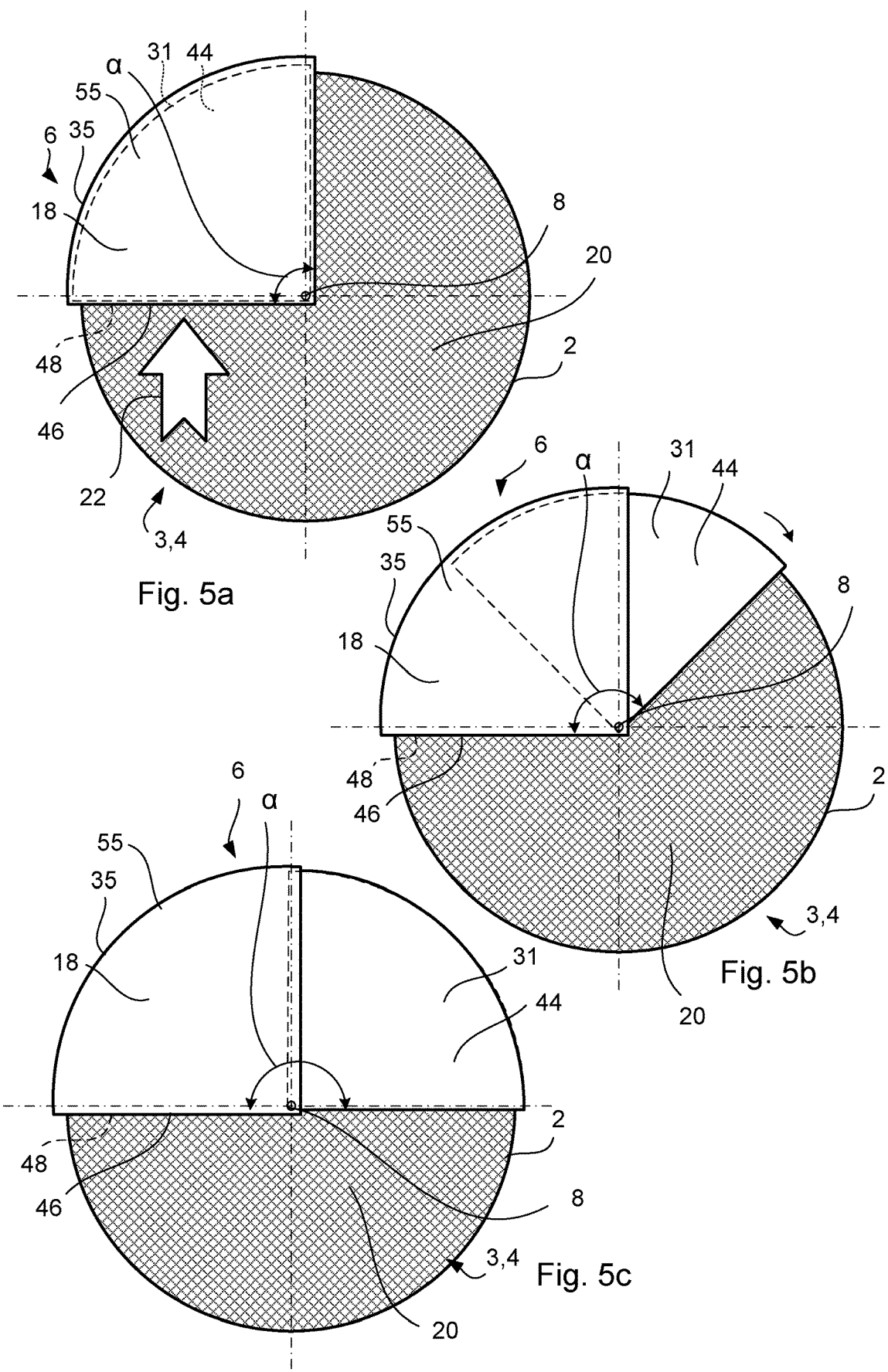

US 11,828,488 B2

PARTITION DEVICE, AN AIR TREATMENT APPARATUS AND A METHOD PERFORMED BY A CONTROL DEVICE, FOR CONTROLLING AN AIR TREATMENT APPARATUS

TECHNICAL FIELD

The invention relates to a partition device, an air treatment apparatus and a method, performed by a control device, for controlling an air treatment apparatus according to the appended claims. The invention also relates to a computer program product and a computer-readable medium according to the appended claims.

BACKGROUND AND PRIOR ART

Rotors for air treatment may be used in different applications, such as in desiccant dehumidifiers, heat exchangers or VOC abatement. The rotor may be made of different materials depending on which application the rotor is used in. The rotor may be provided with a plurality of channels through which air should pass. A rotor arranged in a desiccant dehumidifier may be a desiccant rotor, which may remove moisture from air that passes the rotor. A rotor arranged in a heat exchanger may be a rotatable radiator, which may heat or cool the air that passes the rotor. A rotor for VOC abatement may be using molecular sieves designed to capture certain volatile organic compounds, such as ammonia and ethanol. The rotor may have a center axis about which the rotor may be rotatable.

Desiccant dehumidifiers are especially well-suited for removing moisture from air. The desiccant rotor in the desiccant dehumidifier may be the adsorption dehumidifying component in the dehumidifier. The desiccant rotor may be made of a composite material and designed with a large number of small air channels. The core of composite material may be impregnated with desiccant material that may be highly effective in attracting and retaining water vapour.

The desiccant rotor may be divided in two sections, a process section and a reactivation section. The airflow to be dehumidified, process air, may pass through the process section of the desiccant rotor and leave the rotor as dry air. Simultaneously, another air stream, which may be heated, flows through the reactivation section in an opposite direction, all the while the desiccant rotor may rotate slowly about its longitudinal axis. As the air flows through the process section, the desiccant material in the core of the desiccant rotor may extract moisture from the air. The thus treated air may be returned to the enclosed space in a dehumidified state. The desiccant material may be regenerated by the heated air stream, which may flow through the reactivation section of the desiccant rotor.

The humidity control technique in desiccant dehumidifiers may rely on differences in vapour pressure in order to remove water vapour from air. Humid air may have a relatively high water vapor pressure. In contrast, a dry desiccant surface of the desiccant rotor may have a low water vapour pressure. When the moist air comes in contact with the desiccant surface, the water molecules may move from the humid air to the desiccant surface in an effort to equalize the differential pressure. In the result, the humid air will be dried.

In a heat exchanger a rotatable radiator may be heated or cooled depending on the desired treatment of the air. If air should be heated a section of the rotor may be heated. If the air should be cooled the section of the rotor may be cooled. The heated or cooled section may be used to heat or cool air in a surrounded space.

The dehumidifying process of air may be effective if the desiccant rotor in the desiccant dehumidifier may be effectively regenerated by the heated air stream, which may flow through the reactivation section of the desiccant rotor. Also, the heat exchanging process may be effective if the rotatable radiator in the heat exchanger may be more and less exposed for the air to be heated or cooled.

Air treatment systems are normally designed and optimized for a certain point of operation with regards to air flows, heating and desired change of state including humidity, temperature or VOC content. Normally this leads to a trade-off. Giving the process air a large portion of the rotor's available face-area means that the regeneration sector will be smaller, typically 90° sector, and thus requires a high temperature to achieve full regeneration. In other cases, systems are optimized for being regenerated with low-grade heat such as district heat, which then requires a bigger regeneration sector, up to 180°, leaving less area for the process air sector, meaning lower flow capacity and/or higher pressure drop.

The economically optimal design point depends on operational factors like energy prices (electricity and low grade heat sources), moisture load, required air flow—which all may vary over time. A system designer has to consider multiple scenarios and select a configuration that gives best performance for as many running hours as possible over the years. One challenge is that not all factors are fully known, actual energy prices may change and that the system utilization may also deviate from what was stated during the design phase.

Different systems and methods are known for improving the performance of air treatment arrangements. The document WO2013/038428A1 discloses an apparatus and method for controlling solid desiccant dehumidifiers.

SUMMARY OF THE INVENTION

However, there is a need to develop to an improved air treatment apparatus and a method for controlling an air treatment apparatus. Also, there is a need to be able to regulate the area and shape of the reactivation section.

The object of the invention may therefore be to develop an air treatment apparatus and a method for controlling an air treatment apparatus that enables optimal operation even under varying conditions.

Another object of the invention may also be to be able to regulate the area and shape of the reactivation section.

These objects may be achieved with the above-mentioned partition device, the air treatment apparatus and the method, performed by a control device, for controlling an air treatment apparatus according to the appended claims.

According to the invention the partition device for a reactivation section of an air treatment rotor in an air treatment apparatus comprises: at least one first partition member provided with a first cover area; an inlet opening and an outlet opening for a reactivation air stream; and an actuating member for moving and positioning the at least one first partition member or a part of the at least one first partition member in relation to a centre axis of the air treatment rotor to regulate the area and shape of the reactivation section. Such air treatment apparatus enables optimal operation even under varying conditions.

The air treatment rotor in an air treatment apparatus, may be divided in two sections, a process section and a reactivation section. The airflow of the process air may pass through the process section of the air treatment rotor and leave the rotor as treated air. The air may be treated such that the humidity, the temperature and the purification in the air is changed when passing through the air treatment rotor. Simultaneously, another air stream, which may be heated, flows through the reactivation section in an opposite direction, all the while the air treatment rotor may rotate slowly about its longitudinal axis.

As an example, if the air treatment apparatus is a desiccant dehumidifier comprising a desiccant rotor as an air treatment rotor, the process air flows through the process section of the desiccant rotor and the desiccant material in the core of the desiccant rotor may extract moisture from the air. The thus treated air may be returned to an enclosed space, such a space in a building, in a dehumidified state. The desiccant material may be reactivated by the heated air stream, which may flow through the reactivation section of the desiccant rotor.

Depending on the state of the process air before entering the air treatment rotor and the expected condition of the process air after the process air has passed the air treatment rotor, the reactivation process of the air treatment rotor may be different and vary. Therefore, the reactivation section may be provided with the partition device according to the invention. The at least one first partition member may be provided with a first cover area, an inlet opening and an outlet opening for the reactivation air stream. The first cover area of the first partition member may cover a part of the air treatment rotor. The covered area of the air treatment rotor may be defined as the reactivation section of the air treatment rotor. The reactivation air stream enters the reactivation section defined by the first partition member through the inlet opening, passing through the air treatment rotor and leaves the reactivation section trough the outlet opening. Since the reactivation process of the air treatment rotor may be different and vary, the actuating member is configured for moving and positioning the at least one first partition member or a part of the at least one first partition member in relation to a centre axis of the air treatment rotor to regulate the area and shape of the reactivation section. Regulating the area and shape of the reactivation section means regulating the size of the area of the reactivation section and the shape of the reactivation section. A large reactivation section having a large area may have a large capacity to receive reactivation air and thus a large capacity to reactivate the air treatment rotor. A small reactivation section having a small area may have a small capacity to receive reactivation air and thus a small capacity to reactivate the air treatment rotor. The actuating member may be controlled manually by an operator and/or be controlled by a control device. The actuating member may be connected to the at least one first partition member by means of a shaft, which coincide with the centre axis of the air treatment rotor. Thus, by rotating the shaft, the at least one first partition member or a part of the at least one first partition member may be moved and positioned in relation to a centre axis of the air treatment rotor in order to regulate the area and shape of the reactivation section.

According to an aspect of the invention the partition device for the reactivation section of an air treatment rotor in an air treatment apparatus, comprises: at least one first partition member; an inlet opening and an outlet opening for a reactivation air stream; and an actuating member for moving and positioning the at least one first partition member or a part of the at least one first partition member in relation to a center axis of the air treatment rotor to regulate the area and shape of the reactivation section, wherein the at least one first partition member is provided with a first cover area, which covers the reactivation section, so that the reactivation air stream is directed through the air treatment rotor.

Since the first partition member is provided with a first cover area, which covers the reactivation section, so that the reactivation air stream is directed through the air treatment rotor, the variable reactivation section may be closed and sealed from the process section of the air treatment rotor. As a result, the heated reactivation air stream will not leak out to the process air stream. When the first cover area covers the reactivation section, so that the reactivation air stream is directed through the air treatment rotor, the first partition member will result in a variable reactivation section, which reactivation section is closed and sealed from the process section of the air treatment rotor. The first partition member will be provided with a sealing between the first partition member and the air treatment rotor in the border between the first partition member and the air treatment rotor.

According to an aspect of the invention the actuating member comprises an electric motor for moving and positioning the at least one first partition member. The electric motor may be controlled manually by an operator by means of a switch or similar. Alternatively, or in combination, the electric motor may be controlled by means of a control device. The electric motor may receive control signals, which controls the motor to a position which correspond to a position to which the at least one first partition member or a part of the at least one first partition member should be moved in order to regulate the area and shape of the reactivation section for a typical operation mode of the air treatment apparatus.

According to an aspect of the invention the first partition member is adapted to be foldably and/or pivotally arranged about the centre axis of the air treatment rotor. At a position where the reactivation section should have a small area, the first partition may be folded to a small shape. At a position where the reactivation section should have a large area, the first partition may be unfolded to a large shape. The first partition member may be made of a material, such as plastic or paper, which allows to be folded and unfolded. Alternatively, the first partition member may be made of a material, such as metal or hard plastic. Folding and unfolding of such a first partition member may be accomplished by means of one or several hinges in the first partition member. Folding and unfolding the partition member may be accomplished by pivoting the first partition member about the centre axis of the air treatment rotor.

According to an aspect of the invention the first partition member is foldably configured as a handheld fan or a foldable fan. By arranging the first partition member as a handheld fan, the first partition member may in the folded position have a small shape and cover a small area of the air treatment rotor. Thus the reactivation section will have a small area in the folded position. Folding and unfolding the partition member may be accomplished by pivoting the first partition member about the centre axis of the air treatment rotor, which may be a similar movement of folding an unfolding a handheld fan or a foldable fan. The air treatment rotor may have a circular shape with a radii that is similar to the radii of the handheld fan. The foldable fan is foldably configured, and such foldably configuration is similar to the foldably configuration of the handheld fan.

According to an aspect of the invention at least one second partition member provided with a second cover area; which second cover area together with the first cover area are configured to regulate the area and shape of the reactivation section. At a position where the reactivation section should have a small area, the first and second partition member may be moved in relation to each other so that their respective cover area together will cover a small area of the air treatment rotor. At a position where the reactivation section should have a large area, the first and second partition member may be moved in relation to each other so that their respective cover area together will cover a large area of the air treatment rotor.

According to an aspect of the invention the actuating member comprises an electric motor for moving and positioning at least one of the first and second partition members in relation to each other. The electric motor may be controlled manually by an operator by means of a switch or similar. Alternatively, or in combination, the electric motor may be controlled by means of a control device. The electric motor may receive control signals, which controls the motor to a position which correspond to a position to which the first and second partition member should be moved in order to regulate the area and shape of the reactivation section for a typical operation mode of the air treatment apparatus.

According to an aspect of the invention the first partition member and/or the second partition member are adapted to be pivotally arranged about the centre axis of the air treatment rotor. This may be accomplished by pivoting the first partition member about the centre axis of the air treatment rotor. At a position where the reactivation section should have a small area, the first and second partition member may be pivoted about the centre axis of the air treatment rotor and moved in relation to each other so that their respective cover area together will cover a small area of the air treatment rotor. At a position where the reactivation section should have a large area, the first and second partition member may be pivoted about the centre axis of the air treatment rotor and moved in relation to each other so that their respective cover area together will cover a large area of the air treatment rotor. Moving the first and/or second partition member in order to regulate the area and shape of the reactivation section may thus be accomplished by pivoting the first and/or second partition member about the centre axis of the air treatment rotor.

According to an aspect of the invention first partition member has a shape of a first circular sector; and the second partition member has a shape of a second circular sector. At a position where the reactivation section should have a small area, the first and second partition member may be moved in relation to each other so that their respective cover area will have a large overlap and together will cover a small area of the air treatment rotor. At a position where the reactivation section should have a large area, the first and second partition member may be moved in relation to each other so that their respective cover area have a small overlap and together will cover a large area of the air treatment rotor. The air treatment rotor may have a circular shape with a radii that is similar to the radii of the first and second partition member.

According to an aspect of the invention the first circular sector of the first partition member has a first radii, which is smaller than a second radii of the second circular sector of the second partition member. The first and second partition member may be moved in relation to each other so that their respective cover area will overlap each other and together will cover an area of the air treatment rotor, which area correspond to the area of the reactivation section. If the first partition member has a first radii, which is smaller than a second radii of the second circular sector of the second partition member, the second partition member may embrace or accommodating the first partition member if the first and the second partition member is arranged on both sides of the air treatment rotor and the respective first and the second partition member are connected by means of an peripheral connecting member.

According to an aspect of the invention the inlet and outlet openings for the reactivation air stream are orientated in a plane having a normal that is adapted to be essentially parallel with a centre axis of the air treatment rotor. Such orientation of the inlet and outlet openings for the reactivation air stream may effectively direct and lead the reactivation air stream through the air treatment rotor. The reactivation air stream may pass through both of the inlet and outlet openings and the air treatment rotor in an essentially straight direction.

According to an aspect of the invention the inlet and outlet openings for the reactivation air stream are orientated in a plane adapted to be essentially parallel with a centre axis of the air treatment rotor. Such orientation of the inlet and outlet openings for the reactivation air stream may direct and lead the reactivation air stream in different directions from the inlet opening, trough the air treatment rotor and further to the outlet opening. The reactivation air stream may pass through the inlet opening and further out through the outlet opening in a U-form.

According to an aspect of the invention the inlet and outlet openings for the reactivation air stream have a curvature corresponding to the periphery of the air treatment rotor. Such orientation of the inlet and outlet openings for the reactivation air stream may direct and lead the reactivation air stream in a direction towards the centre of the air treatment rotor. Thus, the inlet and outlet openings for the reactivation air stream may be arranged along the periphery of the air treatment rotor. However, before the reactivation air stream reaches the centre of the air treatment rotor most of the reactivation stream will change direction and pass through the air treatment rotor. After the reactivation air stream has passed the air treatment rotor the reactivation air stream will again change direction and flow out of the outlet openings, which are arranged at the periphery of the air treatment rotor.

According to an aspect of the invention the inlet and outlet openings for the reactivation air stream are arranged in a circular outer wall, which embraces the air treatment rotor, which inlet and outlet openings have a curvature corresponding to the periphery of the air treatment rotor. Thus, the inlet and outlet openings for the reactivation air stream may be arranged along the periphery of the air treatment rotor. Such orientation of the inlet and outlet openings for the reactivation air stream may direct and lead the reactivation air stream in a direction towards the centre of the air treatment rotor.

According to an aspect of the invention the air treatment apparatus comprising an air treatment rotor with a reactivation section, wherein the air treatment apparatus further comprises a partition device.

The air treatment apparatus comprising an air treatment rotor, which may be divided in two sections, a process section and a reactivation section. The airflow of the process air may pass through the process section of the air treatment rotor and leave the rotor as treated air. Simultaneously, another air stream, which may be heated, flows through the reactivation section in an opposite direction, all the while the air treatment rotor may rotate slowly about its longitudinal axis. Depending on the state of the process air before entering the air treatment rotor and the expected condition of the process air after the process air has passed the air treatment rotor, the reactivation process of the air treatment rotor may be different and vary. Therefore, the reactivation section may be provided with the partition device according to the invention.

According to an aspect of the invention a method, performed by a control device, for controlling an air treatment apparatus disclosed herein is provided. The air treatment apparatus comprising an air treatment rotor with a reactivation section, wherein the air treatment apparatus further comprises a partition device for a reactivation section of an air treatment rotor of an air treatment apparatus, the partition device comprising: at least one first partition member provided with a first cover area; an inlet opening and an outlet opening for a reactivation air stream; and an actuating member for moving and positioning the at least one first partition member or a part of the at least one first partition member in relation to a center axis of the air treatment rotor to regulate the area and shape of the reactivation section, wherein the control device is comprised in the air treatment apparatus. The method comprising the steps of identifying a humidity in a process air; comparing the identified humidity of the process air with a reference value of the humidity; and regulating the area and the shape of the reactivation section by means of the at least one first partition member, so that the difference between the humidity of the process air and the reference value of the humidity is minimized.

The humidity in the process air may be identified by means of humidity sensor arranged in the process air stream after the process air stream has passed through the air treatment rotor. Also, humidity sensors may be arranged in the closed space in which the air should be treated by means of the present method. Thus, the humidity in the air in the closed space may be identified by sensors. When the humidity in the process air has been identified, the identified humidity of the process air will be compared with a reference value of the humidity. The reference value of the humidity may be a predetermined value. If there is a difference between identified humidity of the process air and the reference value of the humidity, the area and the shape of the reactivation section may be regulated by means of the at least one first partition member, so that the difference between the humidity of the process air and the reference value of the humidity is minimized.

According to an aspect of the invention a method, performed by a control device, for controlling an air treatment apparatus disclosed herein is provided. The air treatment apparatus comprising an air treatment rotor with a reactivation section, wherein the air treatment apparatus further comprises a partition device for a reactivation section of an air treatment rotor of an air treatment apparatus, the partition device comprising: at least one first partition member; an inlet opening and an outlet opening for a reactivation air stream; and an actuating member for moving and positioning the at least one first partition member or a part of the at least one first partition member in relation to a center axis of the air treatment rotor to regulate the area and shape of the reactivation section, wherein the at least one first partition member is provided with a first cover area, which covers the reactivation section, so that the reactivation air stream is directed through the air treatment rotor, and wherein the control device is comprised in the air treatment apparatus. The method comprising the steps of identifying a humidity in a process air; comparing the identified humidity of the process air with a reference value of the humidity; and regulating the area and the shape of the reactivation section by means of the at least one first partition member, so that the difference between the humidity of the process air and the reference value of the humidity is minimized.

According to an aspect of the invention the method, the step of regulating the area and the shape of the reactivation section for minimizing the difference between the humidity of the process air and the reference value of the humidity comprises controlling the actuating member to move the at least one first partition member or a part of the at least one first partition member in relation to a centre axis of the air treatment rotor.

Depending on the state of the process air before entering the air treatment rotor and the expected condition of the process air after the process air has passed the air treatment rotor, the reactivation process of the air treatment rotor may be different and vary. Therefore, the reactivation section may be provided with the partition device according to the invention. Since the reactivation process of the air treatment rotor may be different and vary, the actuating member is configured for moving and positioning the at least one first partition member or a part of the at least one first partition member in relation to a centre axis of the air treatment rotor to regulate the area and shape of the reactivation section. A large reactivation section having a large area may have a large capacity to receive reactivation air and thus a large capacity to reactivate the air treatment rotor. A small reactivation section having a small area may have a small capacity to receive reactivation air and thus a small capacity to reactivate the air treatment rotor. The actuating member may be controlled by a control device. The actuating member may also or alternatively be controlled manually by an operator. Thus, the at least one first partition member or a part of the at least one first partition member may be moved and positioned in relation to a centre axis of the air treatment rotor in order to regulate the area and shape of the reactivation section.

The air treatment apparatus may comprise one or several sensors connected to the control device. The sensors may detect the humidity in the process air and/or in the reactive air, and/or in the air in a space to be treated by means of the air treatment apparatus. The sensors may further detect the temperature in the process air and/or in the reactive air, and/or in the air in a space to be treated by means of the air treatment apparatus. The sensors may further detect the flow velocity of the process air stream and/or the flow velocity of the reactive air stream, and/or in the air in a space to be treated by means of the air treatment apparatus. Thus, the air treatment apparatus may be provided with sensors may detect the humidity, temperature sensors and/or flow velocity sensors. These sensors may be connected to the control unit and they provide the control unit with information about the humidity, temperature and/or flow velocity. The control unit may also receive information from external data sources, such as a building management system, on current price for electric energy or currently available temperature in a district heating system. The control unit may have algorithms for calculating the most favourable recipe to obtain the desired change of state for the process air in the air treatment system.

According to an aspect of the invention the method may comprise the further step of regulating the flow velocity of the process air stream for minimizing the difference between the humidity of the process air and the reference value of the humidity. The flow velocity of the process air stream may be increased or decreased depending on the value of the difference between the identified humidity of the process air and the reference value of the humidity. However, flow velocity of the process air stream may be regulated in dependence of the area and the shape of the reactivation section.

According to an aspect of the invention the method may comprise the further step of regulating the heat of the reactivation air stream for minimizing the difference between the humidity of the process air and the reference value of the humidity. The heat of the reactivation stream may depend on the area and the shape of the reactivation section. Also, the heat of the reactivation stream may depend on flow velocity of the process air stream through the air treatment rotor.

According to an aspect of the invention the method may comprise the further step of regulating the flow velocity of the reactivation air stream for minimizing the difference between the humidity of the process air and the reference value of the humidity. The flow velocity of the reactivation air stream may influence on the reactivation process of the air treatment rotor. The flow velocity of the reactivation stream may depend on the area and the shape of the reactivation section. Also, the flow velocity of the reactivation air stream may depend on flow velocity of the process air stream through the air treatment rotor. Also, the flow velocity of the reactivation air stream may depend on heat of the reactivation air stream.

According to an aspect of the invention the method may comprise the further step of receiving information from an external data source about energy price and/or available temperature in an external heating system; and regulating the heat of the reactivation air stream and/or regulating the flow velocity of the reactivation air stream for minimizing the difference between the humidity of the process air and the reference value of the humidity. The heat of the reactivation air stream may be generated from an external heating system, such as a district heating system. The external data source, such as a building management system, has information about the current price for electric energy or about currently available temperature in the external heating system. Algorithms for calculating the most favourable recipe to obtain the desired change of state for the process air in the air treatment system may be used.

The above-mentioned objects are also achieved by a computer program comprising instructions, which when the program is executed by a computer, cause the computer to carry out the method. The above-mentioned objects are also achieved by a computer-readable medium comprising instructions, which when executed by a computer, cause the computer to carry out the method.

Additional objectives, advantages and novel features of the invention will be apparent to one skilled in the art from the following details, and through exercising the invention. While the invention is described below, it should be apparent that the invention may be not limited to the specifically described details. One skilled in the art, having access to the teachings herein, will recognize additional applications, modifications and incorporations in other areas, which are within the scope of the invention.

BRIEF DESCRIPTION OF THE DRAWINGS

Below is a description of, as examples, preferred embodiments with reference to the enclosed drawings, in which.

DETAILED DESCRIPTION OF THE DRAWINGS

Figure 1:
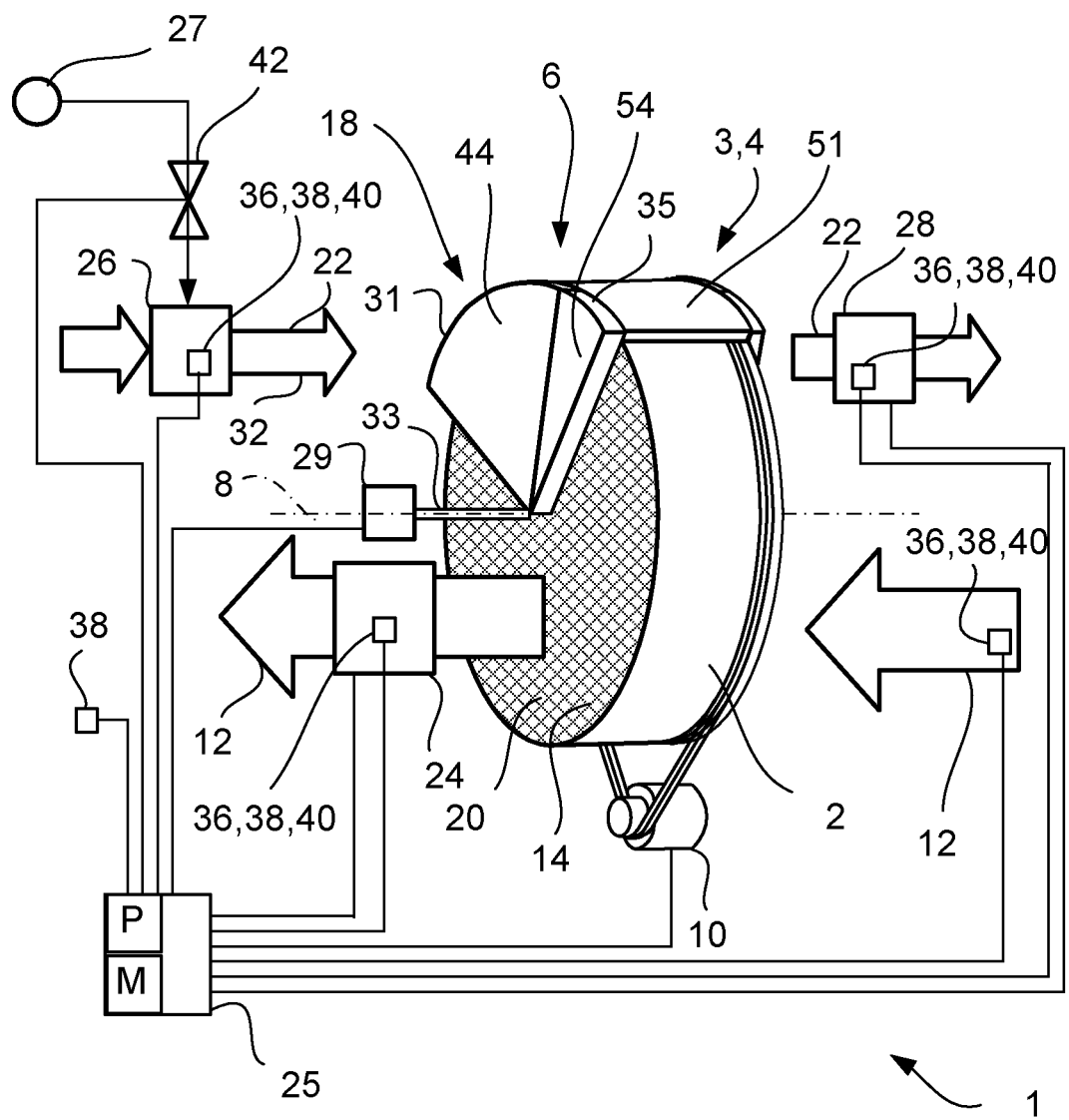
FIG. 1 schematically illustrates an air treatment apparatus according to an embodiment, FIGS. 2a-2c schematically illustrates a partition device for a reactivation section of an air treatment rotor according to an embodiment, FIG. 3 schematically illustrates a side view of the partition device for a reactivation section of an air treatment rotor in FIG. 2a, FIGS. 4a-4c schematically illustrates a partition device for a reactivation section of an air treatment rotor according to an embodiment, FIGS. 5a-5c schematically illustrates a partition device for a reactivation section of an air treatment rotor according to an embodiment, FIGS. 6a-6c schematically illustrates a partition device for a reactivation section of an air treatment rotor according to an embodiment.

FIG. 1 schematically illustrates an air treatment apparatus 1 according to an embodiment. The air treatment apparatus 1 comprises an air treatment rotor 2, which may be a desiccant rotor 2 for a desiccant dehumidifier 3, a rotatable radiator 2 in a heat exchanger 4 or a rotor for VOC abatement. A drive motor 10 may be arranged to rotate the rotor 2 via a transmission. A flow of process air stream 12 may pass a number of channels 14, which are arranged in the rotor 2. The channels 14 may extend from one side to the other of the rotor 2. The channels 14 may be parallel to the center axis 8 of the rotor 2. The flow of process air stream 12 may pass the channels 14 in one or both directions. A desiccant rotor 2 for a desiccant dehumidifier 3 may be adapted to treat the process air stream 12 by reducing water in the process air stream 12 that may pass through the channels 14 of the desiccant rotor 2. A rotatable radiator 2 in a heat exchanger 4 may be adapted to treat the process air stream 12 by heating or cooling the process air stream 12 that may pass through the rotatable radiator 2.

A partition device 6 defines a reactivation section 18 of the air treatment rotor 2. The reactivation section 18 is segregated from the remaining portion of the air treatment rotor. The remaining portion of the rotor 2 may define a process section 20. In a heat exchanger 4, reactivation section 18 of the rotor 2 may be heated or cooled depending on the desired treatment of the process air stream 12. If the process air stream 12 should be heated the reactivation section 18 of the rotor 2 may be heated. If the process air stream 12 should be cooled the reactivation section 18 of the rotor 2 may be cooled. The reactivation section 18 of the rotor 2 may be heated or cooled by means of a reactivation air stream 22.

In a desiccant dehumidifier 3 the process air stream 12 to be dehumidified is allowed to flow through the channels 14 in the desiccant rotor 2. A heated reactivation air stream 22 is, at the same time, allowed to pass in counterflow through the reactivation section 18 of the rotor 2.

The reactivation air stream 22, increase the temperature of the desiccant rotor 2, so that the rotor 2 gives off its moisture which is then carried away by the reactivation air stream 22. The dried desiccant material in the rotor 2 is rotated into the process section 20, where it once again absorbs moisture from the process air stream 12.

A first blower 24 is arranged for drawing a process air stream 12 from the enclosed space and urging it to flow through the process section 20 of the desiccant rotor 2 to thereby remove moisture from the process air stream 12. A process air stream 12 outlet is located downstream of the process section 20 of the desiccant rotor 2 for exhausting the dehumidified process air stream 12 into the enclosed space. The reactivation air stream 22 is drawn from outside the enclosed space and heated in a heater 26. The heater 26 may be provided with a heated fluid, such as heated air or heated water. The heated fluid may emanate from an external heating system 27, such as a district heating system or a process plant at a distance from the air treatment apparatus 1. Thus, the heat may be residual heat from the process plant 27. A second blower 28 may be arranged for drawing the reactivation air stream 22 from outside the enclosed space and urging it to flow through the reactivation section 18 of the desiccant rotor 2 in order to cause the moisture trapped in the reactivation section 18 to be released therefrom into the reactivation air stream 22. A reactivation air outlet 30 is located downstream of the reactivation section 18 of the desiccant rotor 2 for exhausting the moist reactivation air stream 22 outside the enclosed space.

In order to enable a regulation of the area and shape of the reactivation section 18 the partition device 6 comprises an actuating member 29, which may be an electric motor 29 for moving and positioning a first partition member 31 or a part of the first partition member 31 in relation to a center axis 8 of the air treatment rotor 2. The electric motor 29 may be connected to the first partition member 31 by means of a shaft 33, which coincide with the center axis 8 of the air treatment rotor 2. By rotating the shaft 33, the first partition member 31 or a part of the first partition member 31 may be moved and positioned in relation to the center axis 8 of the air treatment rotor 2 in order to regulate the area and shape of the reactivation section 18. The electric motor 29 may be connected to and controlled by a control device 25 and/or a computer. The control device 25 may comprise a computer program P comprising instructions, which when the program is executed by the computer. The control device 25 may also comprise a memory M. The partition device 6 may also comprise second partition member 35, which together with the first partition member 31 is configured to regulate the size of the area of the reactivation section 18 and the shape of the reactivation section 18. The electric motor 29 may be connected to the first partition member 31 and/or the second partition member 35 by means of the shaft 33.

The control device 25 may be configured to control the air treatment apparatus 1 by identifying a humidity in a process air, comparing the identified humidity of the process air with a reference value of the humidity and regulating the area and the shape of the reactivation section 18 by means of the first partition member 31 and/or second partition member 35, so that the difference between the humidity of the process air and the reference value of the humidity is minimized.

The air treatment apparatus 1 may comprise one or several sensors 36, 38, 40 connected to the control device 25. The sensors may be humidity sensors 36, temperature sensors 38 and/or flow velocity sensors 40. These sensors 36, 38, 40 may be connected to the control device 25 and they provide the control device 25 with information about the humidity, temperature and/or flow velocity. A valve 42, connected to the control device 25, may configured to regulate the heat in the heater 26. The first and second bowers 24, 28 may be connected to the control device 25. The control device 25 may be configured to control the flow velocity of the process air stream 12 and of the reactivation air stream 22. The control device 25 may be connected to the drive motor 10. The control device 25 may be configured to control the rotation speed of the air treatment rotor 2 by controlling the drive motor 10.

Figure 2A:
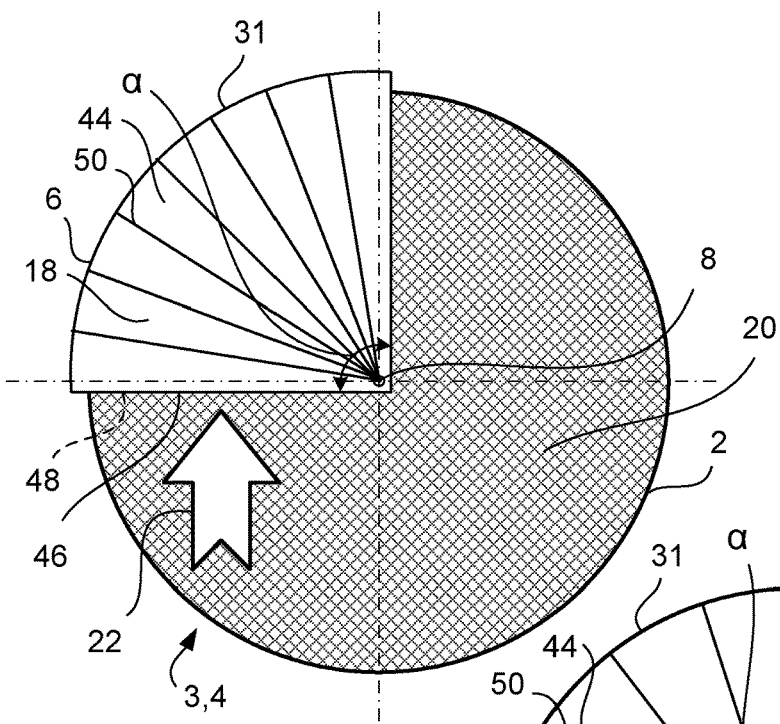
Figure 2B:
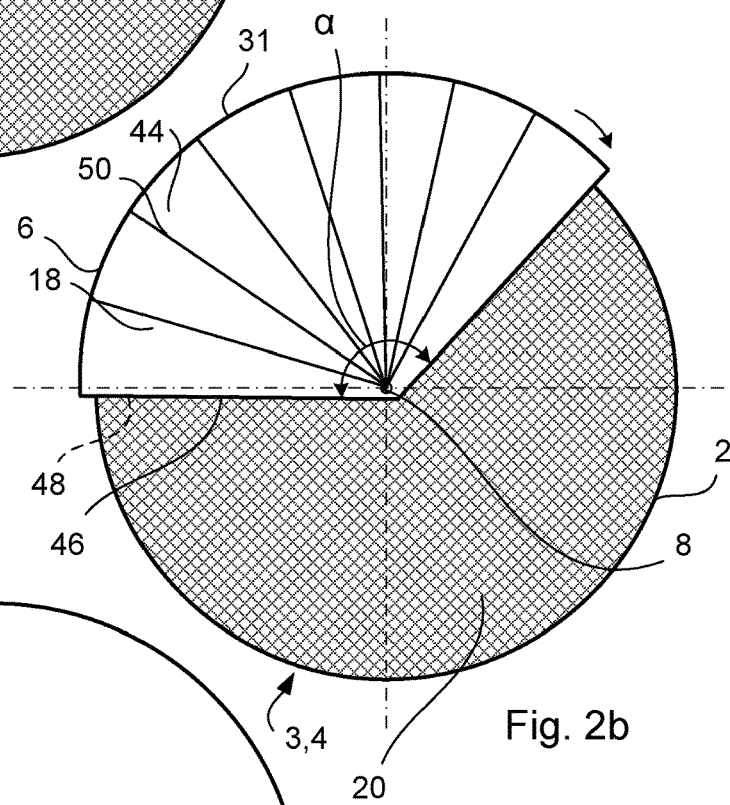
Figure 2C:
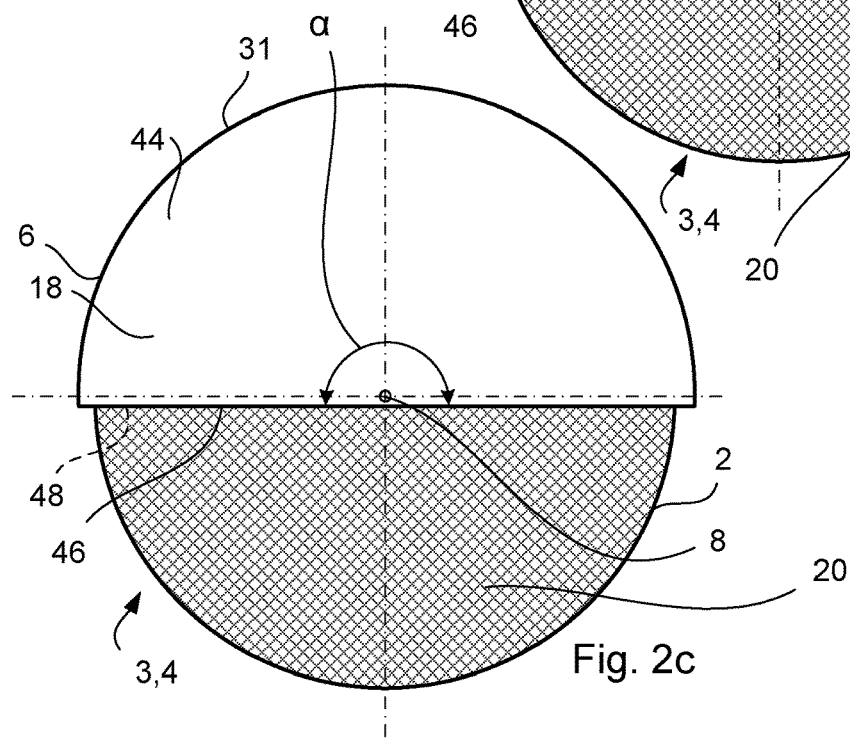

FIGS. 2a-2c schematically illustrates a partition device 6 for a reactivation section 18 of an air treatment rotor 2 according to an embodiment. The partition device 6 comprises a first partition member 31 provided with a first cover area 44. An inlet opening 46 and an outlet opening 48 are arranged for the reactivation air stream 22. The first partition member 31 or a part of the at least one first partition member 31 may be moved and positioned in relation to a center axis 8 of the air treatment rotor 2 in order to regulate the area and shape of the reactivation section 18. The first partition member 31 is, according to this embodiment adapted to be foldably and/or pivotally arranged about the center axis 8 of the air treatment rotor 2. The first partition member 31 may be foldably configured as a handheld fan. In FIG. 2a the first partition has been folded to a small shape, so that the reactivation section 18 has a small area. At a position where the reactivation section 18 should have a large area, the first partition may be unfolded to a large shape. In FIG. 2b the area of the reactivation section 18 has been increased by unfolding the first partition member 31 and increasing an angel α of the reactivation section 18. The first partition member 31 may be made of a material, such as plastic or paper, which allows to be folded and unfolded. Alternatively, the first partition member 31 may be made of a material, such as metal or hard plastic. Folding and unfolding of such a first partition member 31 may be accomplished by means of one or several hinges 50 in the first partition member 31. Folding and unfolding the first partition member 31 may be accomplished by pivoting the first partition member 31 about the center axis 8 of the air treatment rotor 2. In FIG. 2c the area of the reactivation section 18 has been further increased by unfolding the first partition member 31 and thus further increasing the angel α of the reactivation section 18.

Figure 3:
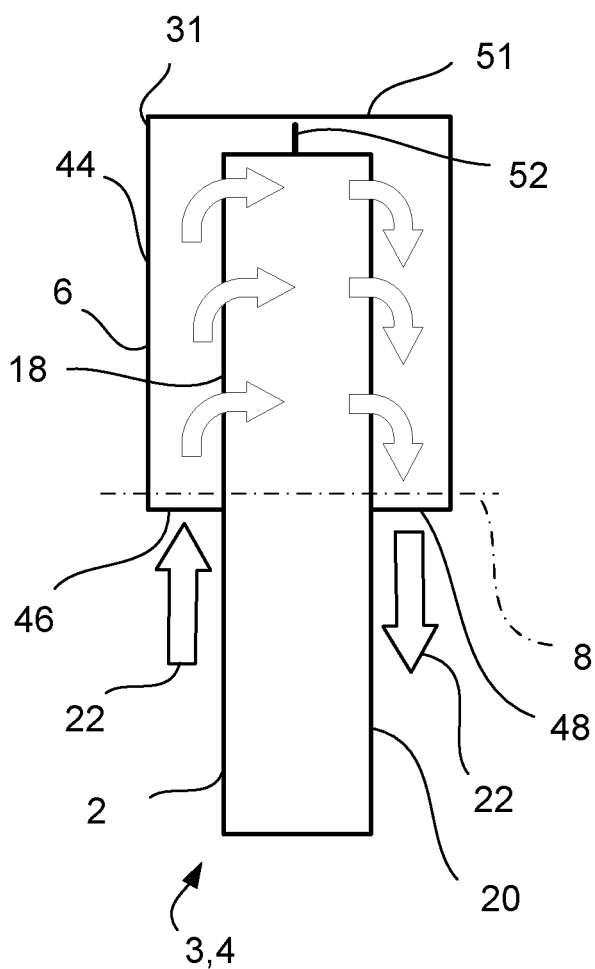

FIG. 3 schematically illustrates a side view of the partition device 6 for a reactivation section 18 of an air treatment rotor 2 in FIG. 2a. The inlet and outlet openings 46, 48 for the reactivation air stream 22 are orientated in a plane adapted to be essentially parallel with a center axis 8 of the air treatment rotor 2. Such orientation of the inlet and outlet openings 46, 48 for the reactivation air stream 22 may direct and lead the reactivation air stream 22 in different directions from the inlet opening 46, through the air treatment rotor 2 and further to the outlet opening 48. The reactivation air stream 22 may pass through the inlet opening 46 and further out through the outlet opening 48 in a U-form. A sealing element 52 may be arranged at the periphery of the air treatment rotor 2 and a connecting member 51 for the partition members 31, 35 arranged on both sides of the air treatment rotor 2. The sealing element 52 may prevent the reactivation air stream 22 from passing between the periphery of the air treatment rotor 2 and the connecting member 51. The reactivation air stream 22 is depicted with arrows in FIG. 3.

FIGS. 4a-4c schematically illustrates a partition device 6 for a reactivation section 18 of an air treatment rotor 2 according to an embodiment. A second partition member 35 is provided with a second cover area 54, which second cover area 54 together with the first cover area 44 of the first partition member 31 are configured to regulate the area and shape of the reactivation section 18. The first partition member 31 and/or the second partition member 35 are adapted to be pivotally arranged about the center axis 8 of the air treatment rotor 2. The first partition member 31 may have a shape of a first circular sector 56 and the second partition member 35 may have a shape of a second circular sector 58. At a position where the reactivation section 18 should have a small area, the first and second partition members 31, 35 may be moved in relation to each other so that their respective cover area together will cover a small area of the air treatment rotor 2. In FIG. 4a the first and second partition members 31, 35 have been moved in relation to each other, so that the reactivation section 18 has a small area. At the position where the reactivation section 18 should have a small area, the respective cover area of the first and second partition members 31, 35 will have a large overlap and together cover a small area of the air treatment rotor 2. At a position where the reactivation section 18 should have a large area, the first and second partition members 31, 35 may be moved in relation to each other so that their respective cover area together will cover a large area of the air treatment rotor 2. In FIG. 4b the area of the reactivation section 18 has been increased by moving the first and second partition members 31, 35 in relation to each other so that their respective cover area together will cover a large area of the air treatment rotor 2. At the position where the reactivation section 18 should have a large area, the respective cover area have a small overlap and together will cover a large area of the air treatment rotor 2. In FIG. 4c the area of the reactivation section 18 has been further increased by moving the first and second partition members 31, 35 in relation to each other. The air treatment rotor 2 may have a circular shape with a radii that is similar to the radii of the first and second partition members 31, 35. The first circular sector 56 of the first partition member 31 has a first radii, which is smaller than a second radii of the second circular sector 58 of the second partition member 35. If the first partition member 31 has a first radii, which is smaller than a second radii of the second circular sector 58 of the second partition member 35, the second partition member 35 may embrace or accommodating the first partition member 31 if the first and the second partition member 35 is arranged on both sides of the air treatment rotor 2 and the respective first and the second partition member 35 are connected by means of an peripheral connecting member 51. The inlet and outlet openings 46, 48 for the reactivation air stream 22 are orientated in a plane having a normal that is adapted to be essentially parallel with a center axis 8 of the air treatment rotor 2. Such orientation of the inlet and outlet openings 46, 48 for the reactivation air stream 22 may effectively direct and lead the reactivation air stream 22 through the air treatment rotor 2. The reactivation air stream 22 may pass through both of the inlet and outlet openings 46, 48 and the air treatment rotor 2 in an essentially straight direction. A movable cover element 60 may be arranged at the center axis 8. The movable cover element 60 may have a shape corresponding to the shape of the inlet and outlet openings 46, 48. In FIG. 4a the movable cover element 60 has a first position, which allows the inlet and outlet openings 46, 48 to be open. In FIG. 4b the movable cover element 60 has a second position, which allows the inlet and outlet openings 46, 48 in one of the partition member to be open, but covers the inlet and outlet openings 46, 48 in the other partition member. In FIG. 4c the movable cover element 60 has the same, second position as in FIG. 4b, but the one of the partition member has been moved further for further increasing the area of the reactivation section 18. The movable cover element 60 may be moved by the actuating member 29 or by the moving partition member 31, 35.

FIGS. 5a-5c schematically illustrates a partition device 6 for a reactivation section 18 of an air treatment rotor 2 according to an embodiment. This embodiment of the partition device 6 is similar to the embodiment according to FIGS. 4a-4c. However, the partition device 6 according to FIG. 5a-5c has inlet and outlet openings 46, 48 for the reactivation air stream 22 orientated in a plane adapted to be essentially parallel with a center axis 8 of the air treatment rotor 2. Such orientation of the inlet and outlet openings 46, 48 for the reactivation air stream 22 may direct and lead the reactivation air stream 22 in different directions from the inlet opening 46, through the air treatment rotor 2 and further to the outlet opening 48. The reactivation air stream 22 may pass through the inlet opening 46 and further out through the outlet opening 48 in a U-form, similar to what is shown in FIG. 3.

Figure 6A:
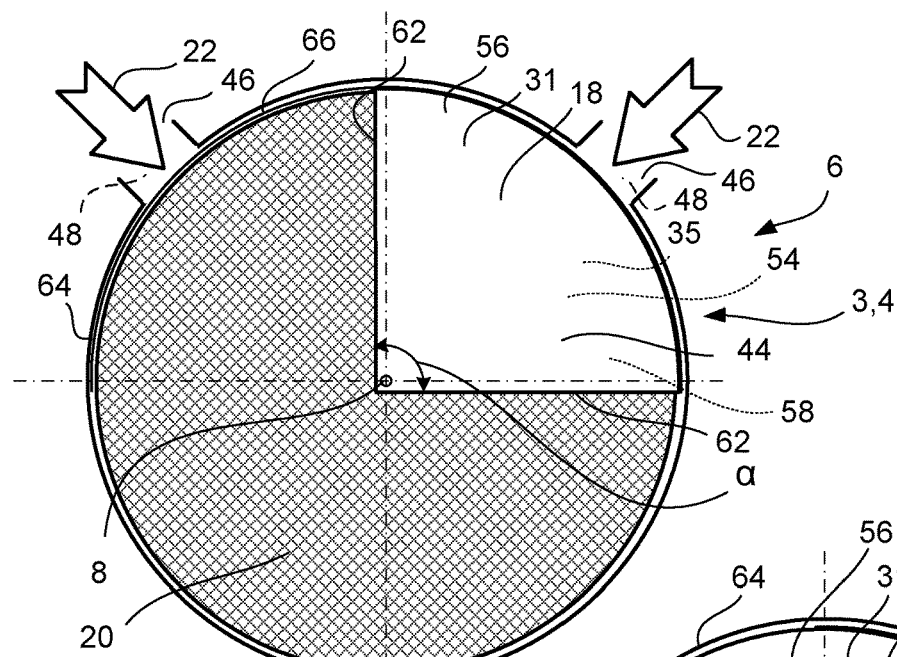
Figure 6B:
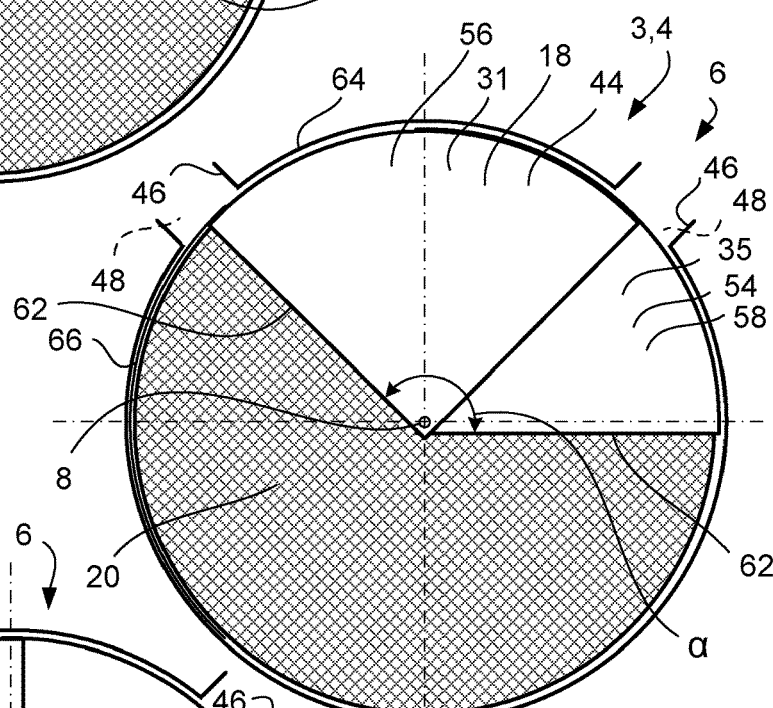
Figure 6C:
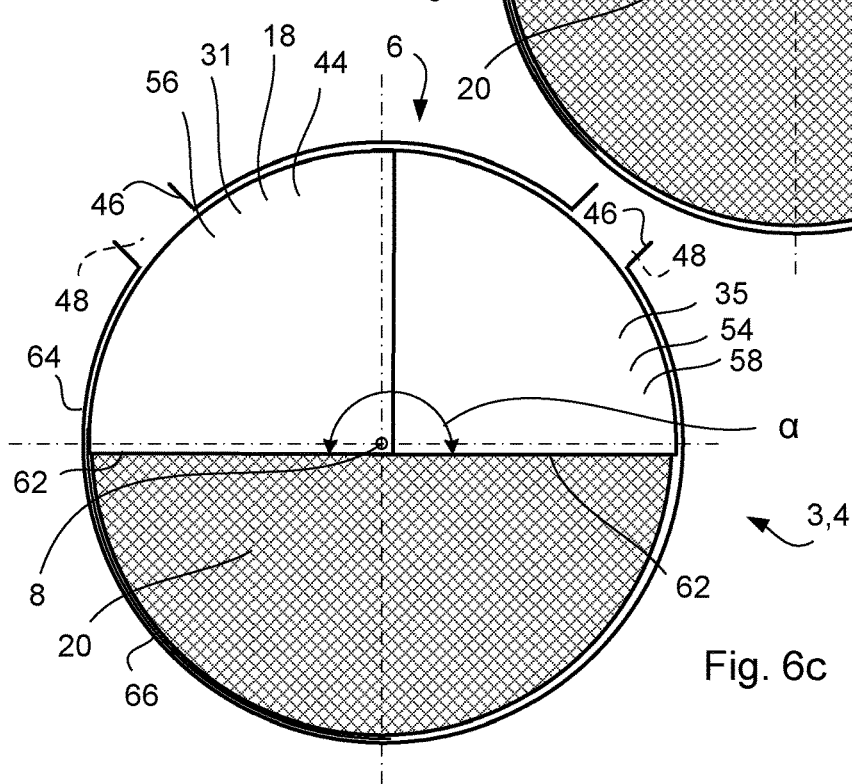

FIGS. 6a-6c schematically illustrates a partition device 6 for a reactivation section 18 of an air treatment rotor 2 according to an embodiment. The inlet and outlet openings 46, 48 for the reactivation air stream 22 have according to this embodiment a curvature corresponding to the periphery of the air treatment rotor 2. Such orientation of the inlet and outlet openings 46, 48 for the reactivation air stream 22 may direct and lead the reactivation air stream 22 in a direction towards the centre of the air treatment rotor 2. However, before the reactivation air stream 22 reaches the centre of the air treatment rotor 2 most of the reactivation air stream 22 will change direction and pass through the air treatment rotor 2. After the reactivation air stream 22 has passed the air treatment rotor 2 the reactivation air stream 22 will again change direction and flow out of the outlet openings 48, which are arranged at the periphery of the air treatment rotor 2. The first partition member 31 has a shape of a first circular sector 56 and the second partition member 35 has a shape of a second circular sector 58. Both circular sectors 56, 58 are arranged at a distance from the air treatment rotor 2. Each circular sector 56, 58 is provided with a wall part 62, which extends in direction towards the air treatment rotor 2. A circular outer wall 64 embraces the air treatment rotor 2 and has a width that is wider than the thickness of the air treatment rotor 2. As a result, the first and second partition members 31, 35 together with at outer wall 64 defines a space, which defines the area and the shape of the reactivation section 18. The inlet and outlet openings 46, 48 for the reactivation air stream 22 are arranged in the outer wall 64, which embraces the air treatment rotor 2. At a position where the reactivation section 18 should have a small area, the first and second partition members 31, 35 may be moved in relation to each other so that their respective cover area 44, 54 will have a large overlap and together will cover a small area of the air treatment rotor 2. In FIG. 6a the first and second partition members 31, 35 have been moved in relation to each other, so that the reactivation section 18 has a small area. The outer wall may be provided with two inlet openings 46. Also, the outer wall may be provided with two outlet openings 48 (not shown in FIG. 6a, since they are hidden behind the two inlet openings 46). The first partition member 31 is provided with a peripheral cover element 66, which is movable in the peripheral direction of the air treatment rotor 2 and arranged between the air treatment rotor 2 and the outer wall 64. In the position where the first and second partition members 31, 35 have been moved in relation to each other, so that the reactivation section 18 has a small area, which corresponds to the position shown in FIG. 6a, the peripheral cover element 66 covers one of the inlet openings 46 and one of the outlet openings 48. In FIG. 6b the area of the reactivation section 18 has been increased by moving the first and second partition members 35 in relation to each other so that their respective cover area together will cover a large area of the air treatment rotor 2. In this position, the peripheral cover element 66 covers only a part of the inlet and outlet openings 46, 48 and the reactivation air stream 22 is allowed to pass through these openings. In FIG. 4c the area of the reactivation section 18 has been further increased by moving the first and second partition members 31, 35 in relation to each other. In this position, the peripheral cover element 66 do not cover the inlet and outlet openings 46, 48 and the reactivation air stream 22 is allowed to pass through these openings 46, 48.

Figure 7:
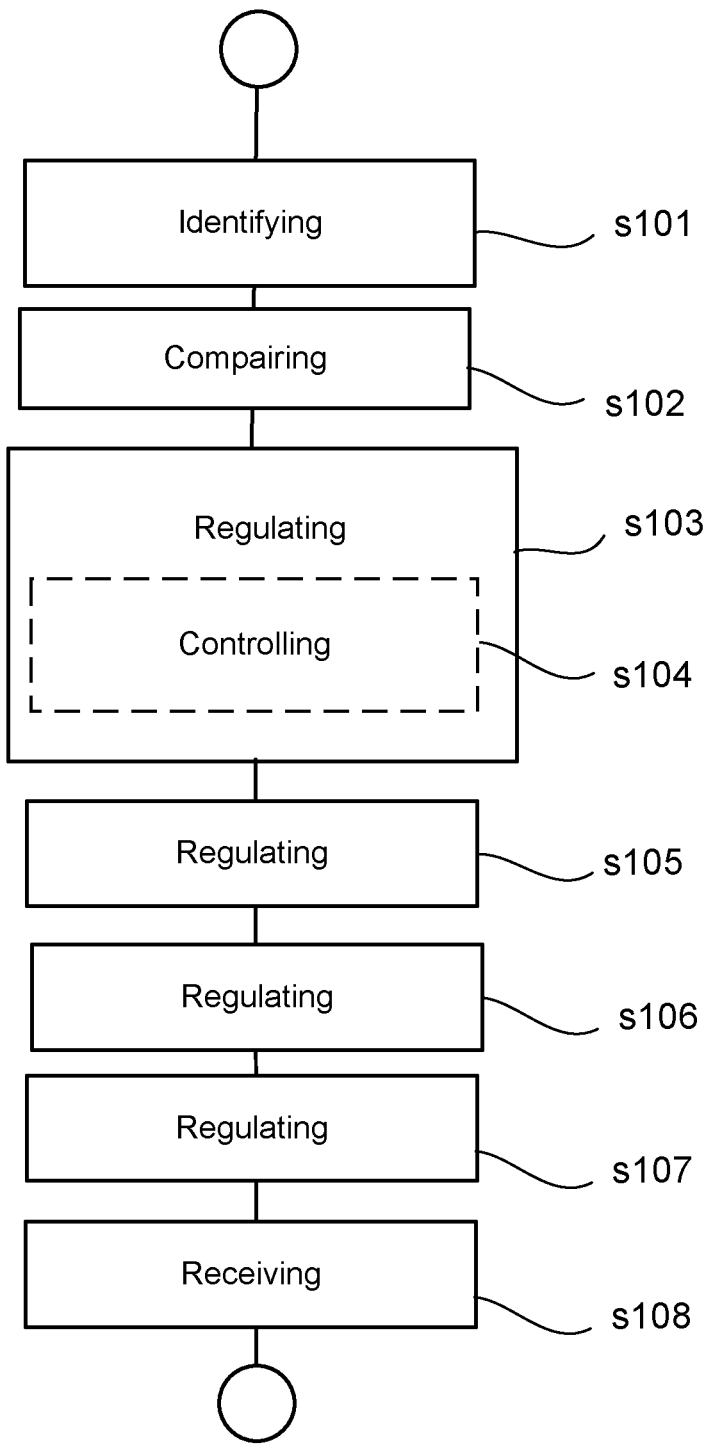
FIG. 7 shows a flow chart for a method performed by a control device, for controlling an air treatment apparatus according to an embodiment, and FIG. 8 schematically illustrates a diagram of a version of a device.

FIG. 7 shows a flow chart for a method performed by a control device 25, for controlling an air treatment apparatus 1 according to an embodiment. The air treatment apparatus 1, comprising an air treatment rotor 2 with a reactivation section 18, wherein the air treatment apparatus 1 further comprises a partition device 6 for a reactivation section 18 of an air treatment rotor 2 of an air treatment apparatus 1. The partition device 6 comprising at least one first partition member 31 provided with a first cover area 44, an inlet opening 46 and an outlet opening 48 for a reactivation air stream 22, and an actuating member 29 for moving and positioning the at least one first partition member 31 or a part of the at least one first partition member 31 in relation to a center axis 8 of the air treatment rotor 2 to regulate the area and shape of the reactivation section 18. The control device 25 is comprised in the air treatment apparatus 1.

The method comprising the steps of identifying s101 a humidity in a process air, comparing s102 the identified humidity of the process air with a reference value of the humidity, and regulating s103 the area and the shape of the reactivation section 18 by means of the at least one first partition member 31, so that the difference between the humidity of the process air and the reference value of the humidity is minimized.

According to an aspect, the step of regulating s103 the area and the shape of the reactivation section 18 for minimizing the difference between the humidity of the process air and the reference value of the humidity comprises controlling the actuating member 29 to move the at least one first partition member 31 or a part of the at least one first partition member 31 in relation to a center axis 8 of the air treatment rotor 2.

According to an aspect, the method may comprise the further step of regulating s105 the flow velocity of the process air stream 12 for minimizing the difference between the humidity of the process air and the reference value of the humidity.

According to an aspect, the method may comprise the further step of regulating s106 the heat of the reactivation air stream 22 for minimizing the difference between the humidity of the process air and the reference value of the humidity.

According to an aspect, the method may comprise the further step of regulating s107 the flow velocity of the reactivation air stream 22 for minimizing the difference between the humidity of the process air and the reference value of the humidity.

According to an aspect, the method may comprise the further step of receiving s108 information from an external data source about energy price and/or available temperature in an external heating system 27; and regulating s106 the heat of the reactivation air stream 22 and/or regulating s107 the flow velocity of the reactivation air stream 22 for minimizing the difference between the humidity of the process air and the reference value of the humidity.

Figure 8:
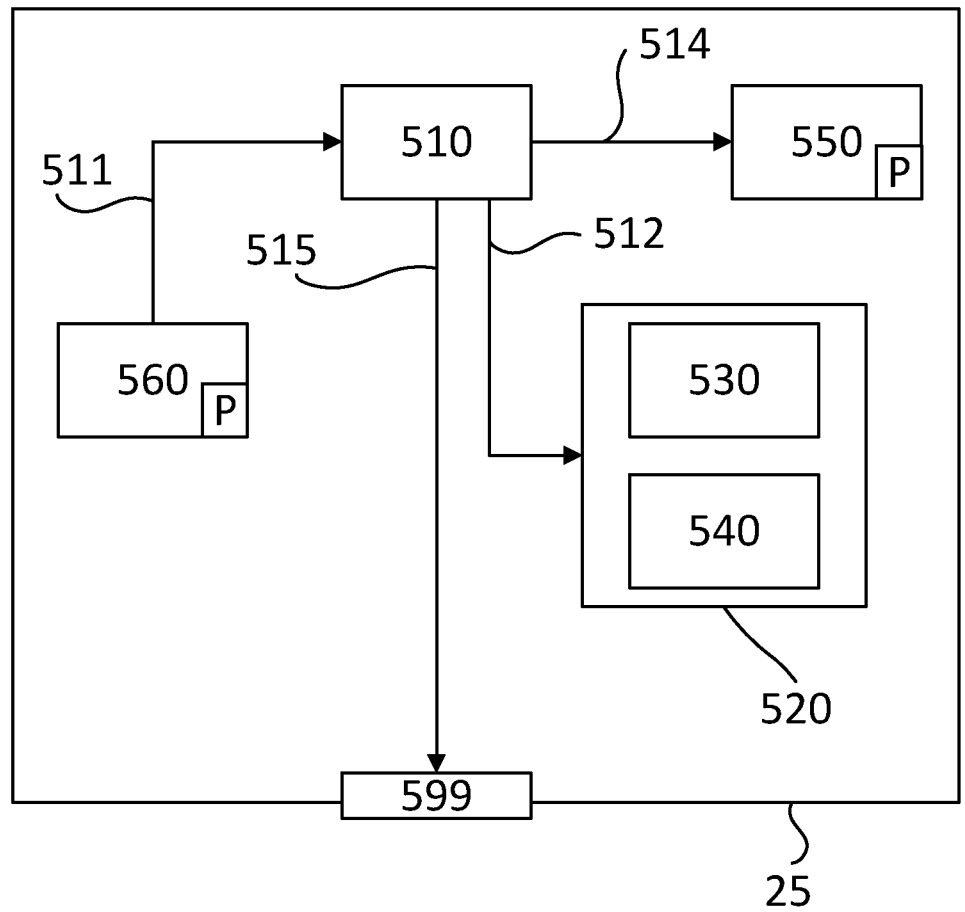

FIG. 8 schematically illustrates a diagram of a version of a device 500. The control device 25 described with reference to FIG. 1 may in a version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer programme P which comprises instructions for carry out the above-mentioned method. The programme P may be stored in an executable form or in a compressed form in a memory 560 and/or in a read/write memory 550.

Where the data processing unit 510 is described as performing a certain function, it means that the data processing unit 510 effects a certain part of the programme stored in the memory 560 or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510 which runs the programme stored in the memory 560 or the read/write memory 550. When the device 500 runs the programme, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

It should be noted that the air treatment apparatus 1 according to the embodiment can be arranged to perform any of the steps or actions described in relation to the method. It should also be understood that the method according to the embodiment can further comprise any of the actions attributed to a feature of the air treatment apparatus 1 described. The same applies to the computer program product and the computer-readable medium. Any type of air may be treated. The air may comprise gases and particles comprising any type of chemical substances.

The invention claimed is:

1. A partition device for a reactivation section of a desiccant rotor in a desiccant dehumidifier, the partition device comprising:
   at least one first partition member;
   an inlet opening and an outlet opening for a reactivation air stream regenerating the desiccant rotor; and
   an actuating member for moving and positioning the at least one first partition member or a part of the at least one first partition member pivotally in relation to a center axis of the desiccant rotor to regulate the area and shape of the reactivation section, wherein the at least one first partition member is provided with a first cover area, configured to cover the reactivation section, and configured to be arranged at a distance from the desiccant rotor, wherein the first partition member is configured to be foldably and pivotally arranged about the center axis on both sides of the desiccant rotor and connected by a peripheral connecting member, or the partition device further comprises a second partition member, wherein the first partition member and/or the second partition member are configured to be pivotally arranged about the center axis of the desiccant rotor, which second partition member is provided with a second cover area configured to cover the reactivation section and configured to be arranged at a distance from the desiccant rotor, the second cover area together with the first cover area being configured to regulate the area and shape of the reactivation section, and wherein the first and the second partition members are configured to be arranged on both sides of the desiccant rotor and the first and second cover areas of the respective first and the second partition members are connected by a peripheral connecting member configured to define a space between the desiccant rotor and the first and second cover areas and the peripheral connecting member.

2. The device according to claim 1, wherein
the actuating member comprises an electric motor for moving and positioning the at least one first partition member.

3. The device according to claim 1, wherein
the first partition member is foldably configured as a handheld fan comprising at least one hinge in the first partition member, so that folding and unfolding of the first partition member is accomplished by the at least one hinge when pivoting the first partition member about the center axis of the desiccant rotor.

4. The device according to claim 1, wherein
the actuating member comprises an electric motor for moving and positioning at least one of the first and second partition members in relation to each other.

5. The device according to claim 1, wherein
the first partition member has a shape of a first circular sector, and
the second partition member has a shape of a second circular sector.

6. The device according to claim 5, wherein
the first circular sector of the first partition member has a first radius, which is smaller than a second radius of the second circular sector of the second partition member.

7. The device according to claim 1, wherein
the inlet and outlet openings for the reactivation air stream are orientated in a plane having a normal that is adapted to be essentially parallel with the center axis of the desiccant rotor.

8. The device according to claim 1, wherein
the inlet and outlet openings for the reactivation air stream are orientated in a plane adapted to be essentially parallel with the center axis of the desiccant rotor.

9. The device according to claim 1, wherein
the inlet and outlet openings for the reactivation air stream have a curvature corresponding to the periphery of the desiccant rotor.

10. A desiccant dehumidifier comprising a desiccant rotor with a reactivation section, wherein the dehumidifier further comprises a partition device according to claim 1.

11. A method, performed by a control device, for controlling a desiccant dehumidifier comprising a desiccant rotor with a reactivation section, wherein the dehumidifier further comprises a partition device for the reactivation section, the partition device comprising:

at least one first partition member;
an inlet opening and an outlet opening for a reactivation air stream regenerating the desiccant rotor; and
an actuating member for moving and positioning the at least one first partition member or a part of the at least one first partition member pivotally in relation to a center axis of the desiccant rotor to regulate the area and shape of the reactivation section,
wherein the at least one first partition member is provided with a first cover area, which covers the reactivation section, and is arranged at a distance from the desiccant rotor, wherein
the first partition member is adapted to be foldably and pivotally arranged about the center axis on both sides of the desiccant rotor and connected by a peripheral connecting member, or
the partition device further comprises a second partition member, wherein the first partition member and/or the second partition member are adapted to be pivotally arranged about the center axis of the desiccant rotor, the second partition member being provided with a second cover area, which covers the reactivation section and is arranged at a distance from the desiccant rotor, the second cover area together with the first cover area being configured to regulate the area and shape of the reactivation section, and wherein the first and the second partition members are arranged on both sides of the desiccant rotor and the first and second cover areas of the respective first and the second partition members are connected by a peripheral connecting member defining a space between the desiccant rotor and the first and second cover areas and the peripheral connecting member,
wherein the control device is comprised in the dehumidifier, the method comprising:
identifying humidity in a process air;
comparing the identified humidity of the process air with a reference value of the humidity; and
regulating the area and the shape of the reactivation section by folding/unfolding the at least one first partition member or by moving the first partition member and the second partition member in relation to each other, so that the difference between the humidity of the process air and the reference value of the humidity is minimized.

12. The method according to claim 11, wherein regulating the area and the shape of the reactivation section for minimizing the difference between the humidity of the process air and the reference value of the humidity comprises controlling the actuating member to move the at least one first partition member or a part of the at least one first partition member in relation to the center axis of the desiccant rotor.

13. The method according to claim 11, further comprising:
regulating the flow velocity of the process air stream for minimizing the difference between the humidity of the process air and the reference value of the humidity.

14. The method according to claim 11, further comprising:
   regulating the heat of the reactivation air stream for minimizing the difference between the humidity of the process air and the reference value of the humidity.

15. The method according to claim 11, further comprising:
   regulating the flow velocity of the reactivation air stream for minimizing the difference between the humidity of the process air and the reference value of the humidity.

16. The method according to claim 11, further comprising:
   receiving information from an external data source about energy price and/or available temperature in an external heating system; and
   regulating the heat of the reactivation air stream and/or regulating the flow velocity of the reactivation air stream for minimizing the difference between the humidity of the process air and the reference value of the humidity.

17. A non-transitory computer-readable medium comprising instructions, which when executed by a computer, cause the computer to carry out the method according to claim 11.

* * * * *